US012609240B2

(12) United States Patent
Li et al.

(10) Patent No.: US 12,609,240 B2
(45) Date of Patent: Apr. 21, 2026

(54) FULL RANGE BOOSTING DEVICE FOR ACCUMULATOR OF ON-LOAD TAP CHANGER, ACCUMULATOR, AND ON-LOAD TAP CHANGER

(71) Applicant: Beijing Aerospace Control Device Institute, Beijing (CN)

(72) Inventors: Zhuangzhuang Li, Beijing (CN); Lihua Xing, Beijing (CN); Xiu Tian, Beijing (CN); Yanli Wang, Beijing (CN); Yapeng Sun, Beijing (CN); Junping Lyu, Beijing (CN); Hui Luo, Beijing (CN); Junduan Zou, Beijing (CN)

(73) Assignee: Beijing Aerospace Control Device Institute, Shenzhen (CN)

( * ) Notice: Subject to any disclaimer, the term of this patent is extended or adjusted under 35 U.S.C. 154(b) by 371 days.

(21) Appl. No.: 18/457,765

(22) Filed: Aug. 29, 2023

(65) Prior Publication Data

US 2023/0402227 A1 Dec. 14, 2023

Related U.S. Application Data

(63) Continuation of application No. PCT/CN2021/108799, filed on Jul. 28, 2021.

(30) Foreign Application Priority Data

Mar. 1, 2021 (CN) ......................... 202110226638.7
Mar. 1, 2021 (CN) ......................... 202110227475.4

(51) Int. Cl.
*H01F 29/04* (2006.01)
*H01F 29/02* (2006.01)

(52) U.S. Cl.
CPC ........... *H01F 29/04* (2013.01); *H01F 29/025* (2013.01)

(58) Field of Classification Search
CPC .. H01H 9/0027; H01H 9/0005; H01H 9/0033; H01H 9/0011; H01H 9/0016;
(Continued)

(56) References Cited

U.S. PATENT DOCUMENTS 4,184,388 A * 1/1980 Sfredda ..................... F16H 1/32 475/330
5,191,179 A * 3/1993 Yatchum ............. H01H 9/0027 200/18
(Continued)

FOREIGN PATENT DOCUMENTS

CN 103430267 A 12/2013
CN 107438889 A 12/2017
(Continued)

OTHER PUBLICATIONS

International Search Report corresponding to PCT Application No. PCT/CN2021/108799, mailed Nov. 22, 2021 (Chinese and English language document) (6 pages).
OA for CN application 202110226638.7.
English translation of OA for CN application 202110226638.7.

*Primary Examiner* — William A Bolton
(74) *Attorney, Agent, or Firm* — Maginot, Moore & Beck, LLP

(57) ABSTRACT

A full range boosting device includes two sheave intermittent mechanisms installed alternately in an up-down direction and a central gear. The two sheave intermittent mechanisms each include a dial gear, a driving dial fixed coaxially with the dial gear with no contact in axial direction, a dial round pin, a driven sheave having a radial slot, and a boosting plate fixedly connected to the driven sheave. Two dial gears are driven by the same central gear. When the
(Continued)

driving dial of one of the sheave intermittent mechanisms rotates an angle of α1, its boosting plate rotates an angle to be boosted by a cooperation of the dial round pin and the radial slot. When the driving dial of the other sheave intermittent mechanism rotates an angle of (360°−α1), its dial round pin is exactly located at a notch of the radial slot.

20 Claims, 6 Drawing Sheets

(58) Field of Classification Search
CPC .......... H01H 9/0038; H01H 3/22; H01H 3/32; H01H 3/3015; H01H 3/3052; H01F 29/04; H01F 29/025
USPC ...................................................... 200/11 TC
See application file for complete search history.

(56) References Cited

U.S. PATENT DOCUMENTS

| | | | | |
|---|---|---|---|---|
| 5,392,664 A * | 2/1995 | Gogins | F16D 31/06 74/117 | |
| 7,518,075 B2 * | 4/2009 | Wrede | H01H 3/3052 200/11 TC | |
| 8,748,758 B2 * | 6/2014 | Hoepfl | H01H 3/3052 200/11 J | |
| 2015/0170847 A1 * | 6/2015 | Wrede | H01H 3/3042 200/11 TC | |

FOREIGN PATENT DOCUMENTS

| | | |
|---|---|---|
| CN | 113113245 A | 7/2021 |
| CN | 113113246 A | 7/2021 |
| DE | 10 2018 132 027 A1 | 6/2020 |

* cited by examiner

FULL RANGE BOOSTING DEVICE FOR ACCUMULATOR OF ON-LOAD TAP CHANGER, ACCUMULATOR, AND ON-LOAD TAP CHANGER

CROSS-REFERENCE TO RELATED APPLICATION

This application is a continuation application of International Application No. PCT/CN2021/108799, filed Jul. 28, 2021, which is based upon and claims priority to Chinese Patent Application No. 202110227475.4 and Chinese Patent Application No. 202110226638.7, both filed Mar. 1, 2021, the entire contents of which are incorporated herein by reference.

FIELD

The present disclosure relates to the technical field of on-load tap changer, and more particularly to a full range boosting device for an accumulator of an on-load tap changer, an accumulator, and an on-load tap changer.

BACKGROUND

As well known, an on-load tap changer is configured to switch from a current winding tap to a new winding tap preselected by an off-load tap selector through an on-load changeover switch when a load is present. Under a load, especially an ultra-high voltage load, if the switching of the on-load changeover switch is not in place, it will cause the on-load changeover switch or even the entire transformer to be unusable. Therefore, in order to improve the reliability of the on-load tap changer, a design focus is to ensure that the on-load tap changer is switched in place.

SUMMARY

Embodiments of the present disclosure seek to solve at least one of the problems existing in the related art to at least some extent.

Embodiments of the present disclosure provide a full range boosting device for an accumulator of an on-load tap changer. The full range boosting device includes a first sheave intermittent mechanism, a second sheave intermittent mechanism, and a central gear. The first sheave intermittent mechanism and the second sheave intermittent mechanism each include a dial gear, a driving dial, a dial round pin, a driven sheave and a boosting plate. The driving dial with the dial round pin and the dial gear are fixed coaxially with no contact in an axial direction, the boosting plate is fixedly connected to the driven sheave, and a radial slot is formed in the driven sheave. The first sheave intermittent mechanism and the second sheave intermittent mechanism are installed alternately in an up-down direction, and two dial gears are driven by the same central gear. A positional relationship of the first sheave intermittent mechanism and the second sheave intermittent mechanism satisfies following constraints: the driving dial of the first sheave intermittent mechanism rotates an angle of $\alpha 1$, and its boosting plate on the driven sheave rotates an angle to be boosted by a cooperation of the dial round pin and the radial slot in the driven sheave; and when the driving dial of the second sheave intermittent mechanism rotates an angle of $(360°-\alpha 1)$, its dial round pin is exactly located at a notch of the radial slot.

Embodiments of the present disclosure provide an accumulator for an on-load tap changer. The accumulator includes an epicyclic gear train, a mechanical energy storage device, the full range boosting device as described above, a drive transmission mechanism with a variable instantaneous transmission ratio, a drive shaft, a driven shaft, a limiting device, and a flywheel. The flywheel is connected to the driven shaft without relative rotation. The drive transmission mechanism with the variable instantaneous transmission ratio is configured to convert a rotation of the drive shaft in any direction into a unidirectional rotational drive of the epicyclic gear train. The limiting device is configured to limit the flywheel during an energy storage process of the mechanical energy storage device. The mechanical energy storage device is configured to perform a mechanical energy storage during a rotation of the epicyclic gear train and a stationary process of a driven wheel, and supply power for the epicyclic gear train to continue to rotate after the energy storage is in place, the epicyclic gear train is configured to unlock the limiting device and drive the flywheel to rotate, and drive the driven shaft to rotate to a predetermined terminal angular position. The full range boosting device provides an auxiliary thrust to ensure that the driven wheel rotates to the predetermined terminal angular position.

Embodiments of the present disclosure provide an on-load tap changer, which includes: the accumulator as described above; an electric mechanism configured to provide a drive rotation power for the drive shaft of the accumulator; an on-load changeover switch; and an off-load tap selector configured to preselect a winding tap to be switched to without load. The on-load changeover switch is configured to switch from a current winding tap to a preselected new winding tap with load.

DETAILED DESCRIPTION

Figure 1:
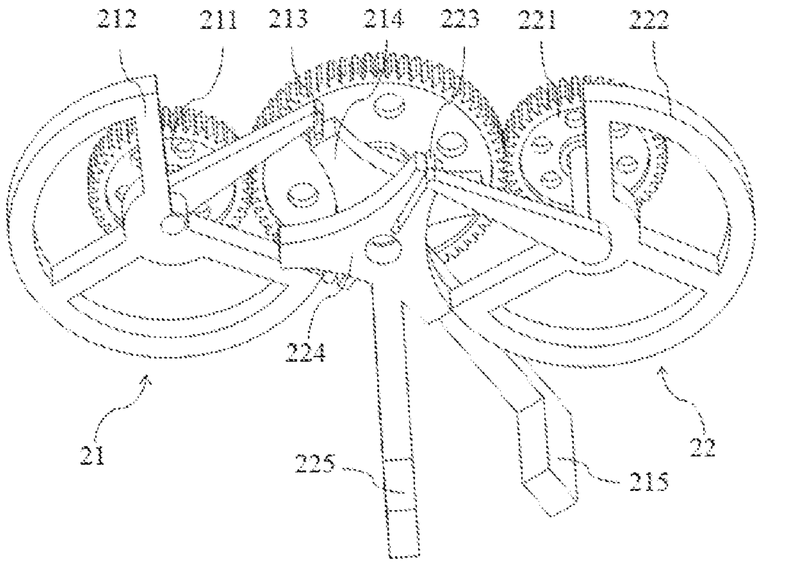
FIG. 1 is a bottom view of a full range boosting device according to embodiments of the present disclosure.
Figure 2:
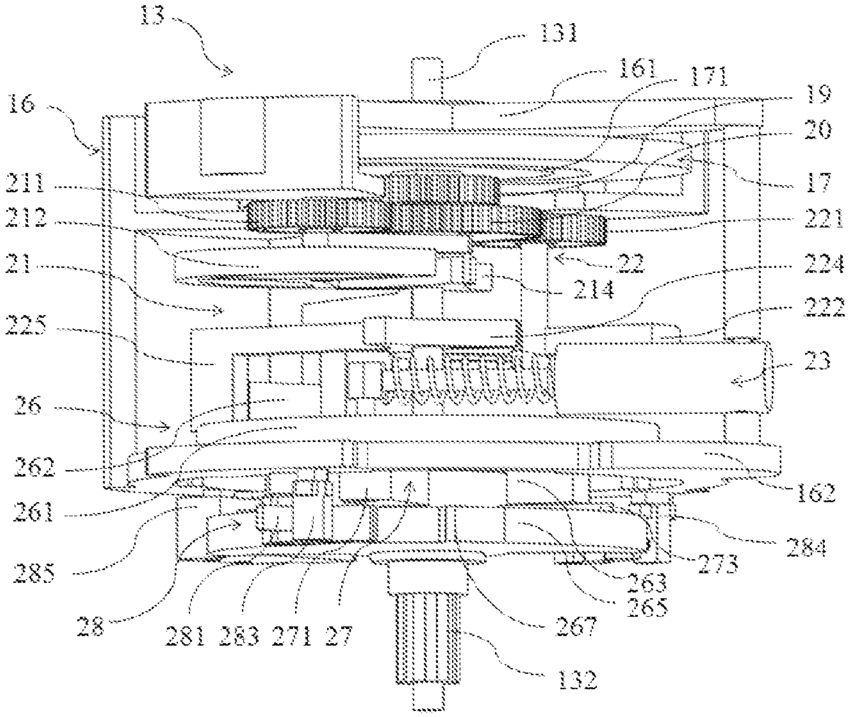
FIG. 2 is a first view of an accumulator for an on-load tap changer according to embodiments of the present disclosure.
Figure 3:
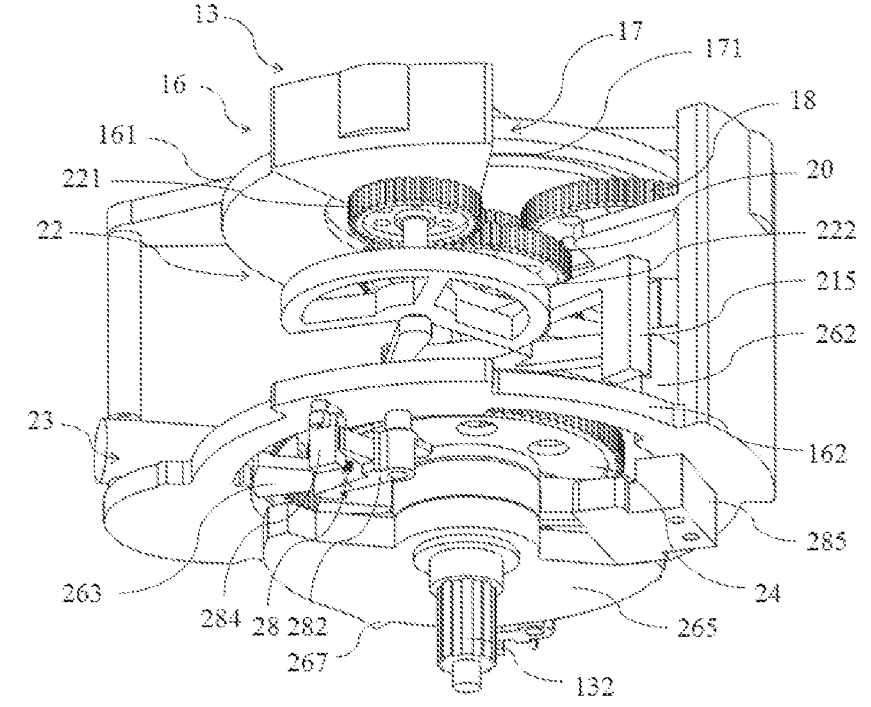
FIG. 3 is a second view of an accumulator for an on-load tap changer according to embodiments of the present disclosure.
Figure 4:
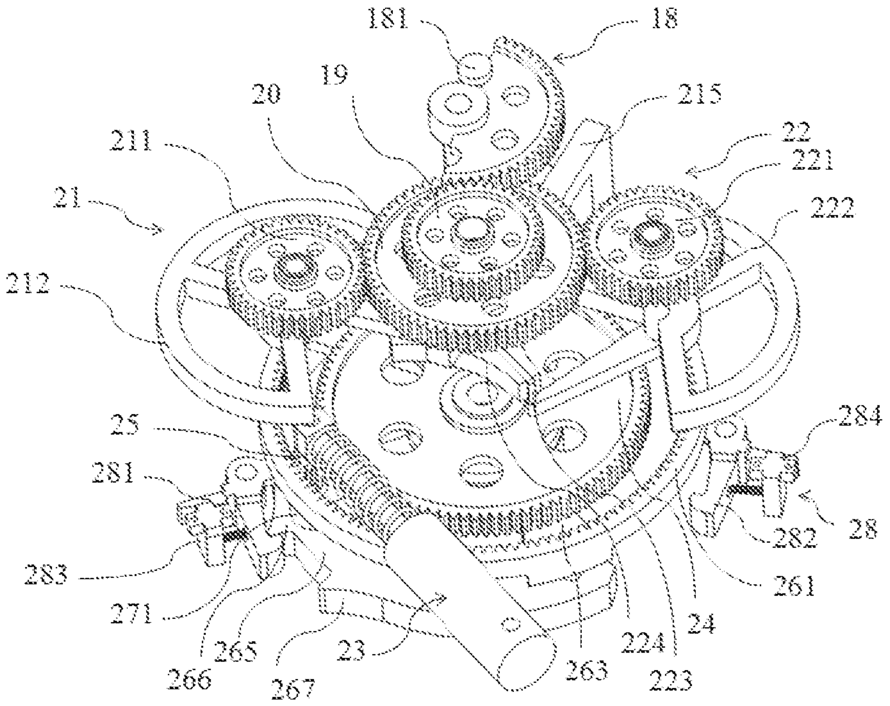
FIG. 4 is a third view of an accumulator for an on-load tap changer according to embodiments of the present disclosure.
Figure 5:
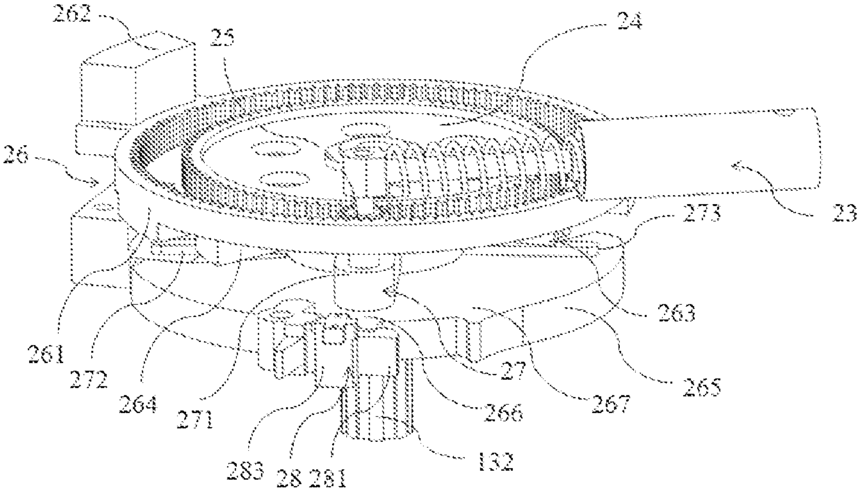
FIG. 5 is a fourth view of an accumulator for an on-load tap changer according to embodiments of the present disclosure.

As well known, an on-load tap changer is configured to switch from a current winding tap to a new winding tap preselected by an off-load tap selector through an on-load changeover switch when a load is present. Under a load, especially an ultra-high voltage load, if the switching of the on-load changeover switch is not in place, it will cause the on-load changeover switch or even the entire transformer to be unusable. Therefore, in order to improve the reliability of the on-load tap changer, a design focus is to ensure that the on-load tap changer is switched in place.

German invention patents DE1956369 and DE2806282, Chinese invention patent CN102024552B and Chinese utility model patent CN2891237 each describe an accumulator for an on-load tap changer. The above accumulators have similar mechanical structures and same working principle, and all belong to carriage type accumulators. Considering an insufficient elasticity of the energy storage spring, high viscosity of the oil under a low temperature and other unfavorable conditions which make the switching of the on-load tap changer not in place, the above accumulators adopt designs as follows. On the one hand, a first roller is disposed at a position of a longest diameter of an eccentric wheel which is close to an axle center, so that after the lower carriage starts to move, if the lower carriage moves slowly to a certain extent, the roller can collide with an impactor on one side of the lower carriage, so that a rotation of the eccentric wheel which is driven directly by an electric mechanism can additionally start a motion of the lower carriage. On the other hand, a second roller is disposed at a position of the longest diameter of the eccentric wheel which is far away from the axle center, so that before the lower carriage reaches a next new terminal position, if the lower carriage moves slowly to a certain extent, the second roller can collide with an impactor on one side of the lower carriage, so that the rotation of the eccentric wheel which is driven directly by the electric mechanism can additionally push the lower carriage to the new terminal position precisely.

Chinese invention patent CN107438889B describes another accumulator for an on-load tap changer. The accumulator has an elastic energy storage element and a transmission, and the transmission includes an input hub, an output hub, a transmission device with a variable transmission ratio, a first coupling device and a second coupling device. Its working process is as follows. In a first stage, stops of upper and lower gears of the first coupling device and the second coupling device are not in contact with each other, and neither the energy storage device nor the driven shaft moves. In a second stage, the stops of the upper and lower gears of the first coupling device are in contact with each other, while the stops of the upper and lower gears of the second coupling device are not in contact with each other. In this stage, the energy storage device is gradually tensioned, and the driven shaft does not move. In a third stage, the stops of the upper and lower gears of the first coupling device are no longer in contact with each other, while the stops of the upper and lower gears of the second coupling device are in contact with each other, and the energy storage device gradually relaxes and drives the driven shaft to rotate to a next extreme position. At this stage, if the rotation speed of the driven shaft is slow to a certain extent, the stops of the upper and lower gears of the first coupling device will be in contact with each other, so that the drive element can catch up with the driven element, and the electric mechanism can cooperate with or replace the energy storage device to drive the driven shaft to rotate. However, due to a small proportion of the switching time of the on-load changeover switch in the entire switching process of the on-load tap changer and a design limitation of the curved slot, the drive element cannot catch up with the driven element in a second half of the rotation process of the driven shaft, so that the boosting function cannot be achieved at this stage.

To sum up, in term of avoidance of a situation that the switching of the on-load changeover switch is not in place under unfavorable circumstances, the above-mentioned accumulators only realize partial boosting, which means that the boosting device of the accumulator has the possibility to assist the rotation of the driven shaft of the accumulator at certain positions during the entire motion process of the driven shaft of the accumulator. However, these accumulators cannot realize the full range boosting which requires that the boosting device of the accumulator has the possibility to assist the rotation of the driven shaft of the accumulator at any position during the entire motion process (especially at a beginning stage and an ending stage) of the driven shaft of the accumulator.

Embodiments of the present disclosure seek to solve at least one of the problems existing in the related art to at least some extent.

For this, embodiments of the present disclosure provide a full range boosting device for an accumulator of an on-load tap changer, an accumulator and an on-load tap changer. The accumulator is able to implement a full range boosting, i.e., the boosting device of the accumulator has the possibility to assist a rotation of the driven shaft of the accumulator at any position during the entire motion process (especially at a beginning stage and an ending stage) of the driven shaft of the accumulator, therefore making up for the blank that the accumulator cannot implement the full range boosting in the technology field of on-load tap changer.

Embodiments of the present disclosure provide a full range boosting device for an accumulator of an on-load tap changer. The full range boosting device includes a first sheave intermittent mechanism, a second sheave intermittent mechanism, and a central gear. The first sheave intermittent mechanism and the second sheave intermittent mechanism each include a dial gear, a driving dial, a dial round pin, a driven sheave and a boosting plate. The driving dial with the dial round pin and the dial gear are fixed coaxially with no contact in an axial direction, the boosting plate is fixedly connected to the driven sheave, and a radial slot is formed in the driven sheave. The first sheave intermittent mechanism and the second sheave intermittent mechanism are installed alternately in an up-down direction, and two dial gears are driven by the same central gear. A positional relationship of the first sheave intermittent mechanism and the second sheave intermittent mechanism satisfies following constraints: the driving dial of the first sheave intermittent mechanism rotates an angle of $\alpha 1$, and its boosting plate on the driven sheave rotates an angle to be boosted by a cooperation of the dial round pin and the radial slot in the driven sheave; and when the driving dial of the second sheave intermittent mechanism rotates an angle of $(360°-\alpha 1)$, its dial round pin is exactly located at a notch of the radial slot.

In some embodiments, in an initial state, a component to be boosted on the accumulator of the on-load tap changer is disposed between two boosting plates.

In some embodiments, only one radial slot is formed in the driven sheave.

Embodiments of the present disclosure provide an accumulator for an on-load tap changer. The accumulator includes an epicyclic gear train, a mechanical energy storage device, the full range boosting device as described above, a drive transmission mechanism with a variable instantaneous transmission ratio, a drive shaft, a driven shaft, a limiting device, and a flywheel. The flywheel is connected to the driven shaft without relative rotation. The drive transmission mechanism with the variable instantaneous transmission ratio is configured to convert a rotation of the drive shaft in any direction into a unidirectional rotational drive of the epicyclic gear train. The limiting device is configured to limit the flywheel during an energy storage process of the mechanical energy storage device. The mechanical energy storage device is configured to perform a mechanical energy storage during a rotation of the epicyclic gear train and a stationary process of a driven wheel, and supply power for the epicyclic gear train to continue to rotate after the energy storage is in place, the epicyclic gear train is configured to unlock the limiting device and drive the flywheel to rotate, and drive the driven shaft to rotate to a predetermined terminal angular position. The full range boosting device provides an auxiliary thrust to ensure that the driven wheel rotates to the predetermined terminal angular position.

In some embodiments, the epicyclic gear train includes a sun gear, at least one planetary gear, a ring gear, and a planet carrier device. The sun gear is fixedly connected with the central gear coaxially, the flywheel is fixedly connected to the ring gear through two starting plates, the at least one planetary gear is disposed between the ring gear and the sun gear through the planet carrier device, and meshes with the ring gear and the sun gear respectively. The planet carrier device is axially located between the ring gear and the flywheel and rotates coaxially with the ring gear and the flywheel, and one end of the mechanical energy storage device is rotatably connected to a central shaft of one of the planetary gears, such that the mechanical energy storage device follows a rotation of one of the planetary gears to implement a state change of tension and relaxation.

In some embodiments, during a process of rotating a driving dial of a sheave intermittent mechanism in the full range boosting device by an angle of $(360°-\alpha 1)$, the ring gear remains stationary due to a limiting function of the limiting device, and one of the planetary gears is driven by the sun gear to run to a dead center position of the epicyclic gear train. At this time, the ring gear is unlocked, and the mechanical energy storage device gradually relaxes from a tensioned state.

In some embodiments, the planet carrier device includes two trigger levers and a planet carrier. The planet carrier includes a central rotating part and protruding struts, the number of the struts corresponds to the number of the planetary gears, and the planetary gears are installed on upper end surfaces of the struts through central shafts. Two trigger levers are protruded from the central rotating part for unlocking the limiting device.

In some embodiments, the limiting device includes two hook protrusions disposed on the flywheel, two hooks, two hook limiting stops and a limiting stop. The hooks, the hook limiting stops and the limiting stop are all installed on a lower bracket. The limiting stop is configured to limit a rotation of the flywheel. The two hooks are configured to cooperate with the respective hook protrusions to implement a rotation restriction on the flywheel after the flywheel is in place during two switches. The hook limiting stop is configured to perform a limiting function in a state where the hook protrusion is not hooked by the hook.

In some embodiments, a main body of the hook is a member bar with a bend hook, and a collision bar and a limiting bar are disposed on two sides of the member bar, respectively. A compression spring is installed between the hook limiting stop and the member bar with the bend hook, when the bend hook is hooked to the hook protrusion, the compression spring is in a compressed state, and the collision bar may be triggered by the trigger lever disposed on the planet carrier device to complete a disengagement of the bend hook from the hook protrusion. After the bend hook is disengaged from the hook protrusion, the compression spring provides a thrust to the member bar with the bend hook, the limiting of the hook is implemented by a cooperation of the limiting bar and the hook limiting stop, and it is ensured that at this time, a position of the collision bar does not interfere with the trigger lever.

In some embodiments, a stress point existing in a contact surface between the bend hook and the hook protrusion and a rotation center of the hook are on the same circular arc surface, centered on a central shaft of the flywheel.

In some embodiments, the drive transmission mechanism with the variable instantaneous transmission ratio includes a curved slotted plate, a drive fan gear, a roller, and a first central gear. The curved slotted plate is connected to the drive shaft without relative rotation, and a curved slot is formed in a lower end surface of the curved slotted plate. The drive fan gear is fixedly connected with the roller in a radial direction that can move in the curved slot, the roller can be driven by the curved slotted plate to drive the drive fan gear to rotate, the drive fan gear meshes with the first central gear, and the first central gear is coaxially fixed with the central gear in the full range boosting device. The curved slot has two terminal angular positions on a same straight line as a center of the central shaft, such that the curved slotted plate is rotated 180° from any direction, and the roller can be rotated from one terminal angular position to another terminal angular position.

In some embodiments, a curve of the curved slot is bounded by the two terminal angular positions. An equation of the curve on a first side is $x'=R\cos(\omega+\beta)$, and $y'=R\sin(\omega+\beta)$. An equation of the curve on a second side is $x''=R\cos(\omega-\beta)$, and $y''=R\sin(\omega-\beta)$. Taking a rotation center of the curved slotted plate as a coordinate origin, x' and x'' are abscissas of various points on the curve, y' and y'' are ordinates of various points on the curve; R is a radial length of the roller of the drive fan gear, ω is a radial inclination angle of the roller of the drive fan gear, and β is a rotation angle of the curved slotted plate.

In some embodiments, $R=\sqrt{x^2+y^2}=\sqrt{(r\cos(\theta+\alpha)+L)^2+(r\sin(\theta+\alpha))^2}$, where x is an abscissa of the roller of the drive fan gear, y is an ordinate of the roller of the drive fan gear, r is a distance between the roller of the drive fan gear and a rotation central axis of the drive fan gear, θ is an inclination angle of starting and ending positions of the drive fan gear, L is a distance between a rotation central axis of the curved slotted plate and the rotation central axis of the drive fan gear, and α is a rotation angle of the drive fan gear.

In some embodiments, the radial inclination angle of the roller of the drive fan gear is $$\omega = \sin^{-1}\left(\frac{r\sin(\pi - \theta - \alpha)}{R}\right),$$

where θ is an inclination angle of starting and ending positions of the drive fan gear, and α is a rotation angle of the drive fan gear.

In some embodiments, the mechanical energy storage device includes an elastic energy storage sleeve and two elastic energy storage guide rods. An elastic energy storage element is sleeved outside the two elastic energy storage guide rods, a first end of a small-diameter elastic energy storage guide rod is hinged on the planetary gear, a second end of the small-diameter elastic energy storage guide rod is inserted into an inner cavity of a large-diameter elastic energy storage guide rod, and the large-diameter elastic energy storage guide rod is inserted into the elastic energy storage sleeve, so that the elastic energy storage element is located in an inner cavity of the elastic storage energy sleeve, and the large-diameter elastic energy storage guide rod and the elastic energy storage sleeve are both hinged with a lower bracket.

Embodiments of the present disclosure provide an on-load tap changer, which includes: the accumulator as described above; an electric mechanism configured to provide a drive rotation power for the drive shaft of the accumulator; an on-load changeover switch; and an off-load tap selector configured to preselect a winding tap to be switched to without load. The on-load changeover switch is configured to switch from a current winding tap to a preselected new winding tap with load.

In some embodiments, the accumulator, the on-load tap changer and the off-load tap selector are connected in series.

In some embodiments, the accumulator is connected with the on-load changeover switch to form a switching core, the switching core and the off-load tap selector are connected in parallel and distributed in a split manner, the off-load tap selector is placed in a transformer, and the switching core is placed outside the transformer.

Embodiments of the present disclosure have advantages as compared with the related art as follows.

1. Considering that in the actual operation of the on-load tap changer, when encountering unfavorable conditions such as insufficient elasticity or failure of the mechanical energy storage device, inability to relax to a predetermined state, being in an overload state, or at a low temperature making the oil around the mechanism very viscous, the driven shaft driven by the mechanical energy storage device runs slower than normal, which cannot realize the full range boosting, the present disclosure proposes a full range boosting device having a full range boosting capability. Specifically, at any position during the entire motion process (especially at the beginning stage and the ending stage) of the driven shaft, if the running speed of the driven shaft is slow to a certain extent, the full range boosting device has at least one component that can catch up with a boosting block on a component directly or indirectly connected with the driven shaft, and cooperate with or replace the mechanical energy storage device to directly drive the boosting block on the component directly or indirectly connected with the driven shaft without delay through mechanical contact, so as to drive the driven shaft to rotate, ensuring that the driven shaft can finally reach the predetermined terminal angular position, so that the reliability of the accumulator is higher.

2. Embodiments of the present disclosure avoid the tedious conversion between a rotary motion and a linear motion of the accumulator and avoid the use of more stages of gear transmission, so that the motion transmission efficiency is higher and the reliability is higher.

3. The limiting device according to embodiments of the present disclosure directly limits the flywheel which has no relative rotation with the driven shaft, the limited object is more direct, and the limiting effect is more reliable.

4. The two hooks of the limiting device according to embodiments of the present disclosure are spaced apart from each other, and in once switching, after the hook is separated from the corresponding hook protrusion, there will be no mechanical contact therebetween, which is beneficial to ensure the service life of the hook, and also reduces the risk of use.

5. The two hooks of the limiting device according to embodiments of the present disclosure are spaced apart from each other, so that after one of the two hooks is separated from the corresponding hook protrusion, the other hook can maintain a static state. Moreover, the limiting device has two hook limiting stops, each of which is configured to perform a limiting function quickly and reliably in a state where the hook is not hooked on the corresponding hook protrusion, thereby ensuring that the two hooks can easily and reliably hook the respective hook protrusions.

In a first aspect, a full range boosting device for an accumulator of an on-load tap changer is provided in the present disclosure. The full range boosting device includes a first sheave intermittent mechanism, a second sheave intermittent mechanism, and a central gear.

The first sheave intermittent mechanism and the second sheave intermittent mechanism each include a dial gear, a driving dial, a dial round pin, a driven sheave and a boosting plate. The driving dial with the dial round pin and the dial gear are fixed coaxially with no contact in an axial direction, the boosting plate is fixedly connected to the driven sheave, and a radial slot is formed in the driven sheave.

The first sheave intermittent mechanism and the second sheave intermittent mechanism are installed alternately in an up-down direction, and two dial gears are driven by the same central gear. A positional relationship of the first sheave intermittent mechanism and the second sheave intermittent mechanism satisfies following constraints:

- the driving dial of the first sheave intermittent mechanism rotates an angle of α1, and its boosting plate on the driven sheave rotates an angle to be boosted by a cooperation of the dial round pin and the radial slot in the driven sheave; and when the driving dial of the second sheave intermittent mechanism rotates an angle of (360°−α1), its dial round pin is exactly located at a notch of the radial slot.

In a second aspect, an accumulator for an on-load tap changer is provided in the present disclosure. The accumulator includes:

- a drive shaft of the accumulator, capable of rotating in any direction under driven by an electric mechanism;
- a driven shaft of the accumulator, capable of driving an on-load changeover switch to rotate;
- a full range boosting device constructed according to the first aspect;
- a mechanical energy storage device;
- a sun gear (i.e., a drive device), which is connected to the mechanical energy storage device and capable of compressing and/or releasing the mechanical energy storage device when the drive shaft rotates;

a ring gear (i.e., driven device), which is connected to the mechanical energy storage device and drives the driven shaft to rotate when the mechanical energy storage device is released; and a mechanical transmission device, which includes:

a drive transmission mechanism with a variable instantaneous transmission ratio, which is connected between the drive shaft and the sun gear; and/or a driven transmission mechanism with a variable instantaneous transmission ratio, which is connected between the ring gear and the driven shaft.

The driven shaft of the accumulator can drive the on-load changeover switch to rotate in a direction during a once switching of the on-load tap changer, and drive the on-load changeover switch to rotate in an opposite direction during a next switching of the on-load tap changer.

Here, for example, an instantaneous transmission ratio of the drive transmission mechanism is defined as $i_1=v_1:v_2$, where $v_1$ is an instantaneous input speed, such as an instantaneous rotational speed of the drive shaft; and $v_2$ is an instantaneous output speed, such as an instantaneous motion speed of the sun gear. For example, an instantaneous transmission ratio of the driven transmission mechanism is defined as $i_2=v_3:v_4$, where $v_3$ is an instantaneous input speed, such as an instantaneous motion speed of the ring gear; and $v_4$ is an instantaneous output speed, such as an instantaneous rotational speed of the driven shaft. It can further be concluded that calculation formulas of the instantaneous output speeds are $v_2=v_1:i_1$, and $v_4=v_3:i_2$. Therefore, a change in the transmission ratio of the transmission mechanism leads to a change in the output speed, and the larger the transmission ratios $i_1$ and $i_2$, the smaller the output speeds $v_2$ and $v_4$.

Here, for example, the drive transmission mechanism with the variable instantaneous transmission ratio is understood as the instantaneous transmission ratio $i_1$ of the drive transmission mechanism may remain equal, or become larger or smaller, or change inversely in sign (such as positive or negative), or be infinite, during a process of rotating the sun gear from angle $\alpha_1$ to angle $\alpha_2$, and/or from angle $\alpha_2$ to angle $\alpha_3$, and/or from angle $\alpha_3$ to angle $\alpha_4$, and/or from angle $\alpha_4$ to angle $\alpha_5$. Similarly, for example, the driven transmission mechanism with the variable instantaneous transmission ratio is understood as the instantaneous transmission ratio $i_2$ of the driven transmission mechanism can remain equal, or become larger or smaller, or change inversely in sign (such as positive or negative), or be infinite, during a process of rotating the ring gear from angle $\alpha_5$ to angle $\alpha_4$, and/or from angle $\alpha_4$ to angle $\alpha_3$, and/or from angle $\alpha_3$ to angle $\alpha_2$, and/or from angle $\alpha_2$ to angle $\alpha_1$.

Here, for example, the once switching of the on-load tap changer is understood as the on-load tap changer completes a complete switching process of preselecting a winding tap (n, n+1) to be switched to without load and switching with load from a current winding tap to a preselected new winding tap (n, n+1). For example, the next switching of the on-load tap changer is understood as the on-load tap changer completes a complete switching process of preselecting a next winding tap (n, n+1) to be switched to without load and switching with load from a current winding tap to a next preselected new winding tap (n, n+1).

The sun gear and the mechanical energy storage device are configured such that the mechanical energy storage device is gradually compressed until it is in a maximum tension state when the sun gear rotates from angle $\alpha_1$ to angle $\alpha_2$, and the driven shaft is stationary during this process.

The mechanical energy storage device, the ring gear and the driven transmission mechanism are configured such that the mechanical energy storage device is gradually relaxed when the sun gear rotates from angle $\alpha_2$ to angle $\alpha_3$, and the driven shaft rotates from angle $\beta_1$ or from an intermediate angular position between angle $\beta_1$ and angle $\beta_2$ to angle $\beta_2$ during this process.

The full range boosting device is configured such that the full range boosting device does not affect, impede or boost the motion of the mechanical energy storage device and/or the sun gear and/or the ring gear and/or the driven shaft and/or the mechanical transmission device, when the sun gear rotates from angle $\alpha_1$ to angle $\alpha_2$;

does not affect, impede or boost the motion of the mechanical energy storage device and/or the sun gear and/or the ring gear and/or the driven shaft and/or the mechanical transmission device, and/or has at least one component which is capable of cooperating with or replacing the mechanical energy storage device to enable the driven shaft to rotate from angle $\beta_1$ or from an intermediate angular position between angle $\beta_1$ and angle $\beta_2$ or to be able to rotate to angle $\beta_2$, when the sun gear rotates from angle $\alpha_2$ to angle $\alpha_3$, and the ring gear and/or the driven shaft moves at a speed equal to or greater than a predetermined speed;

has at least one component which is capable of cooperating with or replacing the mechanical energy storage device to enable the driven shaft to rotate from angle $\beta_1$ or from an intermediate angular position between angle $\beta_1$ and angle $\beta_2$ or to be able to rotate to angle $\beta_2$, when the sun gear rotates from angle $\alpha_2$ to angle $\alpha_3$, and the motion speed of the ring gear and/or the driven shaft is slow to a certain extent.

In particular, the driven shaft remains stationary at angle $\beta_1$ when the sun gear rotates from angle $\alpha_1$ to angle $\alpha_2$.

The sun gear and the mechanical energy storage device are configured such that the mechanical energy storage device is gradually compressed until it is in a maximum tension state when the sun gear rotates from angle $\alpha_3$ to angle $\alpha_2$, and the driven shaft is stationary during this process.

The mechanical energy storage device, the ring gear and the driven transmission mechanism are configured such that the mechanical energy storage device is gradually relaxed when the sun gear rotates from angle $\alpha_2$ to angle $\alpha_1$, and the driven shaft rotates from angle $\beta_2$ or from an intermediate angular position between angle $\beta_1$ and angle $\beta_2$ to angle $\beta_1$ during this process.

The full range boosting device is configured such that the full range boosting device does not affect, impede or boost the motion of the mechanical energy storage device and/or the sun gear and/or the ring gear and/or the driven shaft and/or the mechanical transmission device when the sun gear rotates from angle $\alpha_3$ to angle $\alpha_2$;

does not affect, impede or boost the motion of the mechanical energy storage device and/or the sun gear and/or the ring gear and/or the driven shaft and/or the mechanical transmission device, and/or has at least one component which is capable of cooperating with or replacing the mechanical energy storage device to enable the driven shaft to rotate from angle $\beta_2$ or from an intermediate angular position between angle $\beta_1$ and angle $\beta_2$ or to be able to rotate to angle $\beta_1$, when the sun gear rotates from angle $\alpha_2$ to angle $\alpha_1$, and the ring gear and/or the driven shaft is moving at a speed equal to or greater than a predetermined speed;

has at least one component which is capable of cooperating with or replacing the mechanical energy storage device to enable the driven shaft to rotate from angle $\beta_2$ or from an intermediate angular position between angle $\beta_1$ and angle $\beta_2$ or to be able to rotate to angle $\beta_1$, when the sun gear rotates from angle $\alpha_2$ to angle $\alpha_1$, and the motion speed of the ring gear and/or the driven shaft is slow to a certain extent.

In particular, the driven shaft remains stationary at angle $\beta_2$ when the sun gear rotates from angle $\alpha_3$ to angle $\alpha_2$.

The drive transmission mechanism is configured such that the continuous rotation of the drive shaft in any direction enables the sun gear to rotate from angle $\alpha_1$ to angle $\alpha_2$ and then to angle $\alpha_3$;

the continuous rotation of the drive shaft in any direction enables the sun gear to rotate from angle $\alpha_3$ to angle $\alpha_2$ and then to angle $\alpha_1$.

Here, the drive transmission mechanism may be configured in any desired manner, for example, a crank-rocker mechanism or a curved sheave mechanism.

The drive transmission mechanism according to embodiments of the present disclosure includes a curved slotted plate, a drive fan gear, a roller, and a first central gear, and the curved slotted plate is connected between the drive shaft and the drive fan gear and includes a curved slot. In particular, the drive fan gear includes a rotating wheel with a central shaft, and is fixedly connected with a roller in a radial direction of the central shaft thereof, and the roller can move in a curved slot. The roller can be driven by the curved slot so as to make the drive fan gear and the sun gear rotate.

The curved slot is configured such that the continuous rotation of the drive shaft in any direction enables the sun gear to rotate from angle $\alpha_1$ to angle $\alpha_3$ or from angle $\alpha_3$ to angle $\alpha_1$, and the motions in the above two processes are mirror-symmetrical. A curve of the curved slot is closed.

The mechanical transmission device includes a limiting device, which acts on the driven shaft. The limiting device is configured such that the limiting device prevents the drive shaft from rotating forward and/or reversely out of angle $\beta_2$ (or angle $\beta_1$) when the sun gear rotates from angle $\alpha_2$ to angle $\alpha_3$ (or from angle $\alpha_2$ to angle $\alpha_1$);

prevents the driven shaft from leaving angle $\beta_1$ (or angle $\beta_2$) from either side of angle $\beta_1$ (or angle $\beta_2$) when the driven shaft is located at angle $\beta_1$ (or angle $\beta_2$).

The mechanical transmission device includes a trigger mechanism, which acts on the driven shaft. The trigger mechanism is configured such that the trigger mechanism releases the limiting device when the sun gear is located at angle $\alpha_2$ or during a rotation process of the sun gear from angle $\alpha_2$ to angle $\alpha_3$ or from angle $\alpha_2$ to angle $\alpha_1$.

In a third aspect, an on-load tap changer is provided in the present disclosure. The on-load tap changer includes:

an electric mechanism;

an off-load tap selector configured to preselect a winding tap (n, n+1) to be switched to without load;

an on-load changeover switch configured to switch from a current winding tap to a preselected new winding tap (n, n+1) with load; and an accumulator constructed according to the second aspect.

Herein, the reference signs $\alpha_1/\alpha_{12}/\alpha_2/\alpha_3$ represent several angular positions of the sun gear during a once switching process, and the reference signs $\beta_1/\beta_2$ represent limit angular positions of the driven shaft of the accumulator.

Examples

FIG. 1 shows a full range boosting device for an accumulator of an on-load tap changer. The full range boosting device includes a first sheave intermittent mechanism, a second sheave intermittent mechanism and a central gear (i.e., a second central gear in the accumulator). The first sheave intermittent mechanism and the second sheave intermittent mechanism each include a dial gear, a driving dial, a dial round pin, a driven sheave and a boosting plate. The driving dial with the dial round pin and the dial gear are fixed coaxially with no contact in an axial direction, the boosting plate is fixedly connected to the driven sheave, and a radial slot is formed in the driven sheave. The first sheave intermittent mechanism and the second sheave intermittent mechanism are installed alternately in an up-down direction, and two dial gears are driven by the same central gear. A positional relationship of the first sheave intermittent mechanism and the second sheave intermittent mechanism satisfies following constraints: the driving dial of the first sheave intermittent mechanism rotates an angle of α1, and its boosting plate on the driven sheave rotates an angle to be boosted by a cooperation of the dial round pin and the radial slot in the driven sheave; and when the driving dial of the second sheave intermittent mechanism rotates an angle of (360°−α1), its dial round pin is exactly located at a notch of the radial slot. In an initial state, a component to be boosted on the accumulator of the on-load tap changer is disposed between the two boosting plates. In the accumulator given below, the component to be boosted is a ring gear boosting block 262. According to different installation positions, the component to be boosted may be installed on a driven shaft of a traditional accumulator or on a component directly or indirectly connected with the driven shaft.

FIG. 2, FIG. 3, FIG. 4 and FIG. 5 show views of an accumulator 13 for an on-load tap changer 10 according to embodiments of the present disclosure from different angles. The accumulator 13 includes a bracket 16, a curved slotted plate 17, a drive fan gear 18, a first central gear 19, a second central gear 20, a first sheave intermittent mechanism 21, a second sheave intermittent mechanism 22, a mechanical energy storage device 23, a sun gear 24, a planetary gear 25, an output device 26, a planet carrier device 27, and a limiting device 28. Specifically, the bracket 16 includes an upper bracket plate 161, a lower bracket plate 162 and a support column between the upper bracket plate 161 and the lower bracket plate 162. The curved slotted plate 17 is located below the upper bracket plate 161 and is connected with a drive shaft 131 of the accumulator without relative rotation. The curved slotted plate 17 has a curved slot 171, and the curved slot 171 includes a first terminal angular position 172 and a second terminal angular position 173. A roller 181 capable of moving in the curved slot 171 is fixedly connected to the drive fan gear 18 in a radial direction of the drive fan gear 18. The roller 181 can be driven by the curved slotted plate 17 to make the drive fan gear 18 rotate. A central axis of the first central gear 19 is on a same straight line as the drive shaft 131 of the accumulator, and the drive fan gear 18 drives the first central gear 19 to rotate with a fixed transmission ratio. In order to ensure a certain transmission ratio, a diameter of the first central gear 19 is relatively small. Also, in order to ensure a certain transmission ratio and avoid a too small diameter of the dial gear, the first central gear 19 is fixedly connected to the second central gear 20 with a larger diameter coaxially, with no contact in an axial direction, and the second central gear 20 simultaneously drive a first dial gear 211 of the first sheave intermittent mechanism 21 and a second dial gear 221 of the second sheave intermittent mechanism 22 to rotate at a same transmission ratio.

The first sheave intermittent mechanism 21 and the second sheave intermittent mechanism 22 have similar mechanical structures, and both are typical sheave mechanisms, but the first sheave intermittent mechanism and the second sheave intermittent mechanism are designed to be arranged alternately in an up-down direction, so as to avoid structural interference while reducing the occupied space. Illustrations are made with reference to the first sheave intermittent mechanism 21 as an example, the first sheave intermittent mechanism 21 includes a first dial gear 211, a first driving dial 212, a first dial round pin 213, a first driven sheave 214 and a first boosting plate 215. The first driving dial 212 and the first dial gear 211 are fixed coaxially with no contact in an axial direction. The first boosting plate 215 is fixedly connected to the first driven sheave 214 at a specific position. The first driven sheave 214 has a resting range of 300° and a motion range of 60°, and may have 3 radial slots. In an embodiment, the first driven sheave 214 has only one radial slot, with no slot at other two positions. The working principle of the first sheave intermittent mechanism 21 is as follows. The first driving dial 212 rotates under the drive of the first dial gear 211, and when the first dial round pin 213 on the first driving dial 212 has not entered the radial slot of the driven sheave 214, because a concave locking arc of the first driven sheave 214 is blocked by a convex locking arc of the first driving dial 212, the first driven sheave 214 and the first boosting plate 215 remain stationary at the moment. When the first dial round pin 213 just entered the radial slot of the first driven sheave 214, the concave locking arc of the first driven sheave 214 is also just separated from the convex locking arc of the first driving dial 212. Thereafter, the first driven sheave 214 is driven by the first dial round pin 213 to rotate, and drives the first boosting plate 215 to move. The first boosting plate 215 is configured to push the ring gear boosting block 262 on the output device 26 when necessary.

The sun gear 24, the planetary gear 25, the ring gear 261 of the output device 26 and a planet carrier 271 of the planet carrier device 27 form a typical epicyclic gear train together. The sun gear 24 is fixed coaxially with the first central gear 19 and the second central gear 20 with no contact in the axial direction. A first end of the mechanical energy storage device 23 is rotatably connected to a central shaft of the planetary gear 25, and a second end of the mechanical energy storage device 23 is rotatably connected above the lower bracket plate 162.

The output device 26 further includes the ring gear boosting block 262, a first starting plate 263, a second starting plate 264, a flywheel 265, a first hook protrusion 266 and a second hook protrusion 267. The ring gear boosting block 262 is fixedly connected to an outer ring of the ring gear 261 and is configured to transmit a boosting force of the boosting plates 215 and 225 to the ring gear 261. On the one hand, the starting plates 263 and 264 are configured to fixedly connect the flywheel 265 on the ring gear 261, and on the other hand, the starting plates 263 and 264 are configured to collide with a strut of the planet carrier 271 directly and instantaneously when the ring gear 261 starts to rotate, thereby helping the ring gear 261 start the rotation. The hook protrusions 266 and 267 are located in a middle region of an arc surface of the flywheel 265.

The planet carrier device 27 further includes a first trigger lever 272 and a second trigger lever 273. The trigger levers 272 and 273 on a same plane are fixedly connected to the planet carrier 271 and rotate coaxially with the ring gear 261 and the flywheel 265. The trigger levers 272 and 273 are located below the lower bracket 162 and are configured to trigger a first hook 281 and a second hook 282 of the limiting device 28.

The limiting device 28 includes the first hook 281, the second hook 282, a first hook limiting stop 283, a second hook limiting stop 284 and a limiting stop 285. The first hook 281 and the second hook 282 are able to hook the respective hook protrusions 266 and 267 by means of their bend hook portions, so as to limit the rotation of the flywheel 265 in a forward direction or a reverse direction. The limiting stop 285 has a stop damping on two collision surfaces with the flywheel 265 for preventing the flywheel 265 from rotating more than a required angle.

The first hook 281 and the second hook 282 have the same structure, a main body of each of the first and second hooks is a member bar with a bend hook, and a collision bar and a limiting bar are disposed on two sides of the member bar respectively. A compression spring is installed between the hook limiting stop and the member bar with the bend hook. When the bend hook is hooked to the hook protrusion, the compression spring is in a compressed state, and the collision bar may be triggered by the trigger lever disposed on the planet carrier device to complete a disengagement of the bend hook from the hook protrusion. After the bend hook is disengaged from the hook protrusion, the compression spring provides a thrust to the member bar with the bend hook, the limiting of the hook is implemented by a cooperation of the limiting bar and the hook limiting stop, and it is ensured that at this time, a position of the collision bar does not interfere with the trigger lever. A stress point existing in a contact surface between the bend hook and the hook protrusion and a rotation center of the hook are on the same circular arc surface, centered on a central shaft of the flywheel.

Outer collision surfaces of the hook protrusions 266 and 267 are matched with outer collision surfaces of the respective hooks 281 and 282, so that the hook protrusions 266 and 267 can be pressed to the respective hooks 281 and 282 during a motion of the flywheel 265, and locked stably by the respective hooks 281 and 282 by means of their inner bending surfaces and the inner bending surfaces of the respective hooks 281 and 282.

When the hook 281 (or 282) is not hooked to the flywheel 265, the two small compression springs and the hook limiting stop 283 (or 284) cooperate together to prevent the trigger lever 172 (or 173) from colliding with a corresponding hook 281 (or 282). When the hook 281 (or 282) is hooked to the flywheel 265, the two small compression springs and the hook limiting stop 283 (or 284) cooperate together to enable the hook 281 (or 282) to stably hook the flywheel 265, and can be triggered by a corresponding trigger lever 172 (or 173) to release the flywheel 265.

Figure 6:
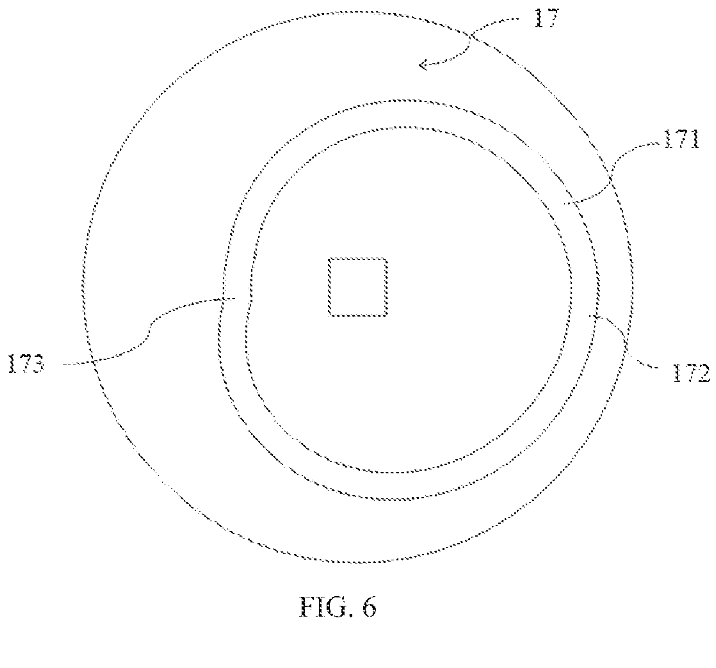
FIG. 6 is a bottom view of a curved slotted plate for an accumulator according to embodiments of the present disclosure.

FIG. 6 shows a curved slotted plate 17 of an accumulator 13 according to embodiments of the present disclosure. Specifically, a first terminal angular position 172 and a second terminal angular position 173 are on a same straight line as a rotation center point of the curved slotted plate 17, so a rotation angle of the curved slotted plate 17 from a current first terminal angular position 172 to a current second terminal angular position 173 or from a current second terminal angular position 173 to a current first terminal angular position 172 is both 180°. During a once switching process of a tap changer 10, a drive shaft of the accumulator may rotate 180° in any direction, so that the roller 182 is able to rotate from one terminal angular position 172 (or 173) to another terminal angular position 173 (or 172).

Figure 7:
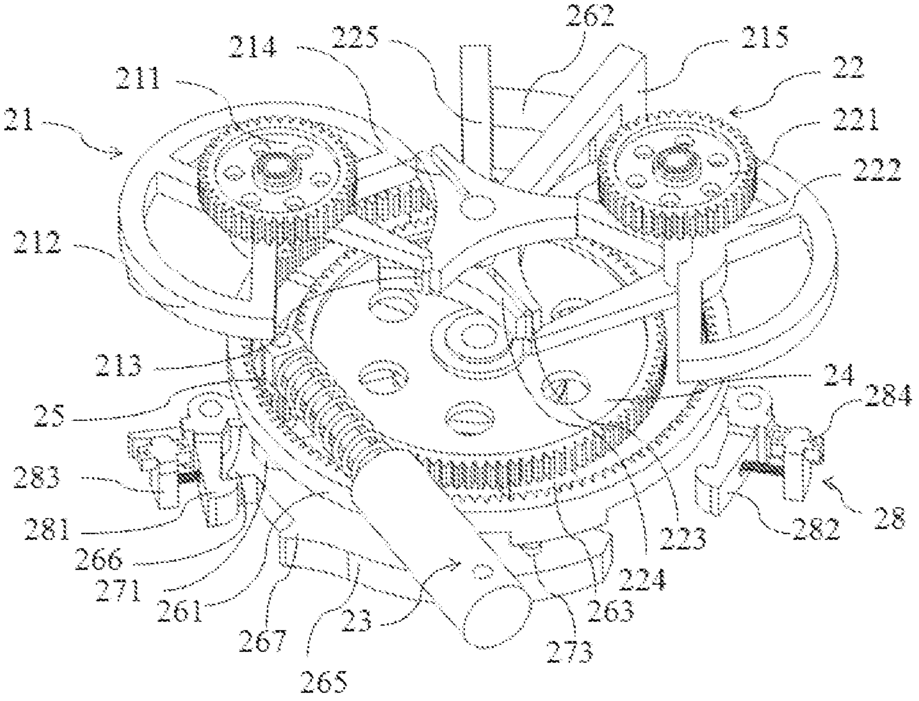
FIG. 7 is a view of a sun gear for an accumulator in an angular position of $\alpha_1$ according to embodiments of the present disclosure.

FIG. 7, FIG. 8, FIG. 9 and FIG. 10 show views of some components of an accumulator 13 according to embodiments of the present disclosure at four moments of a working process. A working manner of the accumulator 13 according to embodiments of the present disclosure is as follows. As shown in FIG. 7, the sun gear 24 is located at a position of $\alpha_1$. The roller 181 of the drive fan gear 18 is located at the first terminal angular position 172 of the curved slotted plate 17. The first hook protrusion 266 of the flywheel 265 is hooked by the first hook 281. The driven shaft 132 of the accumulator is located at an angular position of $\beta_1$. The energy storage compression spring of the mechanical energy storage device 23 is in a relaxed state. The first dial round pin 213 is attached to a side of the first driven sheave 214 without a radial slot, and may move away from the first driven sheave 214 when rotating clockwise. The second dial round pin 223 is located at the notch of the radial slot of the second driven sheave 224, and may enter the radial slot of the second driven sheave 224 when rotating clockwise. The radial slot of the first driven sheave 214 and the radial slot of the second driven sheave 224 are on a same straight line. The boosting plates 215 and 225 are respectively located at both sides of the ring gear boosting block 262 and are in extreme positions. The boosting plate 215 has no obstacle in a clockwise direction, and the boosting plate 225 has no obstacle in a counterclockwise direction. During the movement, the curved slotted plate 17 will rotate continuously at a constant speed in any rotation direction. After the movement starts, the drive fan gear 18 is driven by the curved slotted plate 17 to rotate in the clockwise direction. Driven by the drive fan gear 18, the central gears 19 and 20 and the sun gear 24 rotate counterclockwise. On the one hand, because the flywheel 265 is hooked by the first hook 281 and is blocked by a limiting stop 285, the ring gear 261 remains stationary at an initial position. At this time, in the epicyclic gear train, the planetary gear 25 cannot rotate, and the sun gear 24, the planetary gear 25 and the ring gear 261 together form a planetary gear train. The sun gear 24 acts as a driving gear to drive the planetary gear 25 to perform "orbital revolution" around the sun gear 24 in the counterclockwise direction, so as to compress the energy storage compression spring of the mechanical energy storage device 23 until the mechanical energy storage device 23 reaches a position shown in FIG. 8. On the other hand, driven by the second central gear 20, the dial gears 211 and 221 rotate clockwise, so as to drive the driving dials 212 and 222 to rotate clockwise also. The first dial round pin 213 gradually moves away from the first driven sheave 214, and a convex locking arc of the first driving dial 212 gradually enters a concave locking arc of the first driven sheave 214, so that the first driven sheave 214 and the first boosting plate 215 fixedly connected thereto remain stationary. The second dial round pin 223 enters the radial slot of the second driven sheave 224, and drives the second driven sheave 224 and the second boosting plate 225 to quickly rotate in the counterclockwise direction until the sheave intermittent mechanisms 21 and 22 reach the position shown in FIG. 8.

Figure 8:
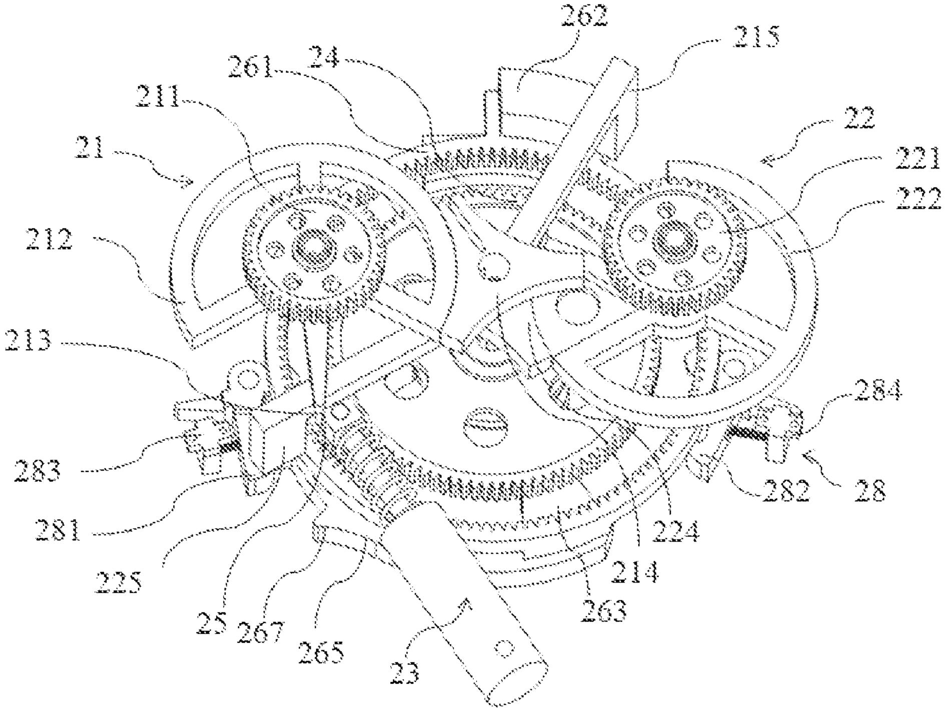
FIG. 8 is a view of a sun gear for an accumulator in an angular position of $\alpha_{12}$ according to embodiments of the present disclosure.

At the position shown in FIG. 8, the sun gear 24 is located at an angular position of $\alpha_{12}$. The mechanical energy storage device 23 is compressed to a certain position, but the compression amount does not reach a maximum value. An end of the convex locking arc of the first driving dial 212 rotates a certain angle to reach an end of a concave locking arc of the first driven sheave 214. The first driven sheave 214 and the first boosting plate 215 are still at initial positions. The second dial round pin 223 completes the driving on the second driven sheave 224 and is about to move away from the notch of the radial slot of the second driven sheave 224 in the clockwise direction. At the same time, a convex locking arc of the second driving dial 222 is about to enter a concave locking arc of the second driven sheave 224. The second boosting plate 225 moves away from the ring gear boosting block 262 in the counterclockwise direction, and rotates to a next extreme position. After continuing to move, the sun gear 24 continues to rotate in the counterclockwise direction under the drive of the curved slotted plate 17. On the one hand, the ring gear 261 remains stationary at the initial position. The energy storage compression spring of the mechanical energy storage device 23 continues to be gradually compressed under the drive of the planetary gear 25 until the mechanical energy storage device 23 reaches a position shown in FIG. 9. On the other hand, the driving dials 212 and 222 continue to rotate in the clockwise direction until the sheave intermittent mechanisms 21 and 22 reach the position shown in FIG. 9.

Figure 9:
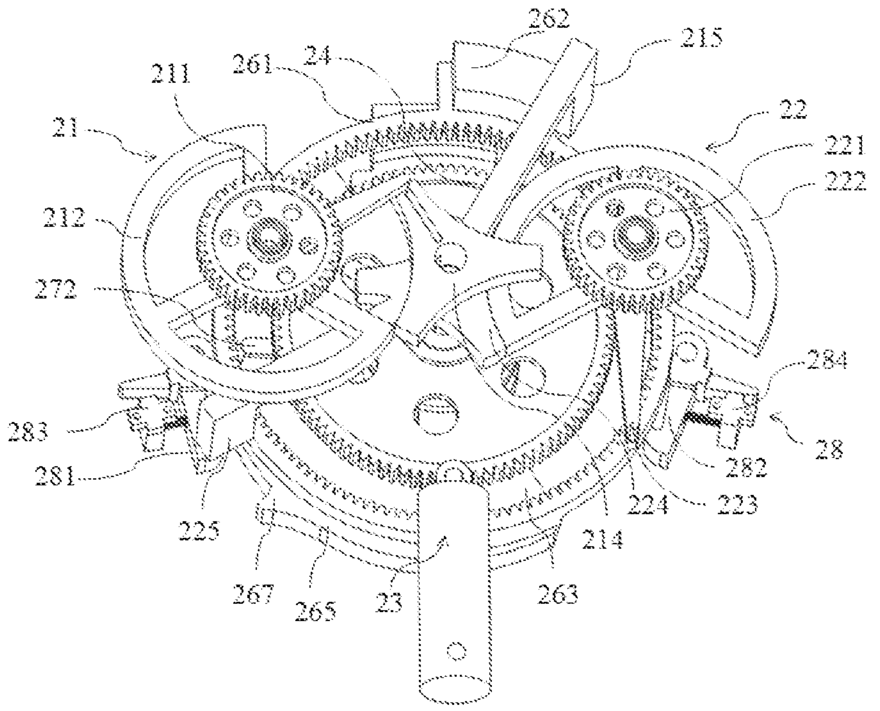
FIG. 9 is a view of a sun gear for an accumulator in an angular position of $\alpha_2$ according to embodiments of the present disclosure.

At the position shown in FIG. 9, the sun gear 24 is located at an angular position of $\alpha_2$. The mechanical energy storage device 23 is compressed to a dead center position and the compression amount reaches the maximum value. Driven by the planetary gear 25, the first trigger lever 272 of the planet carrier device 27 gradually moves in the counterclockwise direction and just contacts with the first hook 281 of the limiting device 28 at this time. The first dial round pin 213 just reaches the notch of the radial slot of the first driven sheave 214, and a convex locking arc of the first driving dial 212 is about to disengage from a concave locking arc of the first driven sheave 214. At this time, the first driven sheave 214 and the first boosting plate 215 are still at initial positions. The second dial round pin 223 is near a side of the second driven sheave 224 without a radial slot, and an end of a concave locking arc of the second driving dial 222 reaches an end of a convex locking arc of the second driven sheave 224. After continuing to move, the sun gear 24 continues to rotate in the counterclockwise direction under the drive of the curved slotted plate 17. On the one hand, the first trigger lever 272 of the planet carrier device 27 triggers the first hook 281 immediately to release the flywheel 265. The planet carrier 271 of the planet carrier device 27 collides with the first starting plate 263 mechanically. At this time, the sun gear 24, the planetary gear 25 and the ring gear 261 together form a differential gear train, and the sun gear 24 and the planetary gear 25 act as driving gears to together drive the ring gear 261 to rotate quickly in the counterclockwise direction in a stepped manner until the ring gear 261 and the boosting block 262 reach the position shown in FIG. 10. On the other hand, the first dial round pin 213 enters into the radial slot of the first driven sheave 214 and drives the first driven sheave 214 and the first boosting plate 215 to rotate rapidly in the counterclockwise direction. In particular, at any moment after the ring gear 261 starts to rotate, if a rotation speed of the ring gear 261 is slow to a certain extent under the drive of the mechanical energy storage device 23, the first boosting plate 215 will directly contact with the ring gear boosting block 262 of the ring gear 261. At this time, an electric mechanism 11 may cooperate with or replace the mechanical energy storage device 23 to drive the ring gear 261 to rotate. The second dial round pin 223 continues to rotate in the clockwise direction and gradually approaches a side of the second driven sheave 224 without the radial slot until the sheave intermittent mechanisms 21 and 22 reach the position shown in FIG. 10.

Figure 10:
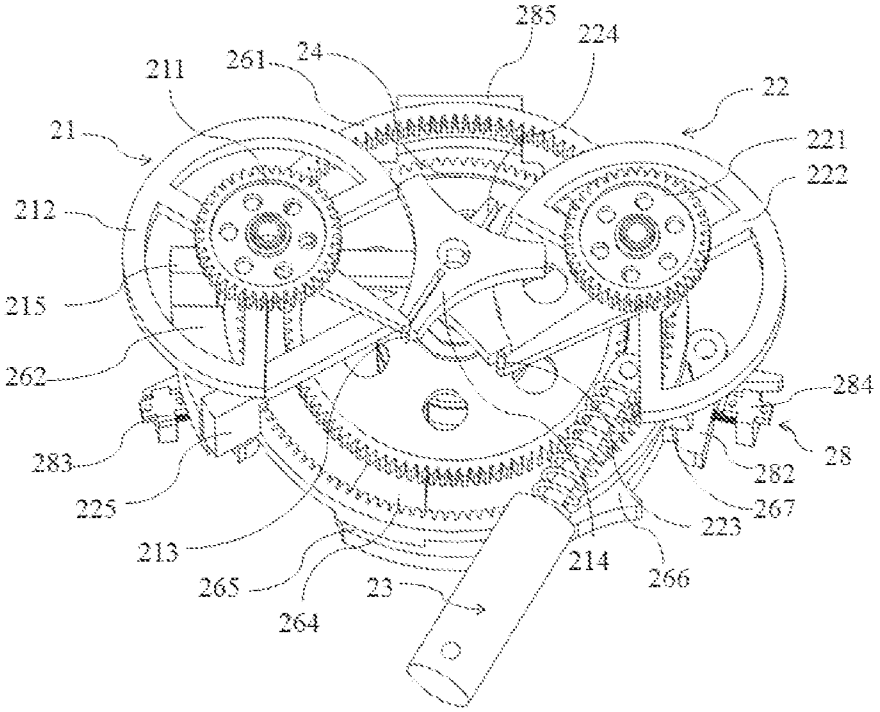
FIG. 10 is a view of a sun gear for an accumulator in an angular position of $\alpha_3$ according to embodiments of the present disclosure.

At the position shown in FIG. 10, the sun gear 24 is located at an angular position of $\alpha_3$. The roller 181 of the drive fan gear 18 is located at the second terminal angular position 173 of the curved slotted plate 17. The second hook protrusion 267 of the flywheel 265 is hooked by the second hook 282, and the other side of the flywheel 265 is blocked by the limiting stop 285. The driven shaft 132 of the accumulator is located at an angular position of $\beta_2$. The energy storage compression spring of the mechanical energy storage device 23 is in the relaxed state again. The first dial round pin 213 is located at the notch of the radial slot of the first driven sheave 214, and can enter the radial slot of the first driven sheave 214 when rotating in the counterclockwise direction. The second dial round pin 223 is attached to a side of the second driven sheave 224 without a radial slot, and can rotate in the counterclockwise direction to move away from the second driven sheave 224. The radial slot of the first driven sheave 214 and the radial slot of the second driven sheave 224 are on a same straight line. The boosting plates 215 and 225 are respectively located at both sides of the ring gear boosting block 262 and are in extreme positions. The boosting plate 215 has no obstacle in the clockwise direction, and the boosting plate 225 has no obstacle in the counterclockwise direction. At this point, the accumulator has completed all actions of the once switching process of the on-load tap changer 10, and is located at an initial position for a next switching.

Figure 11:
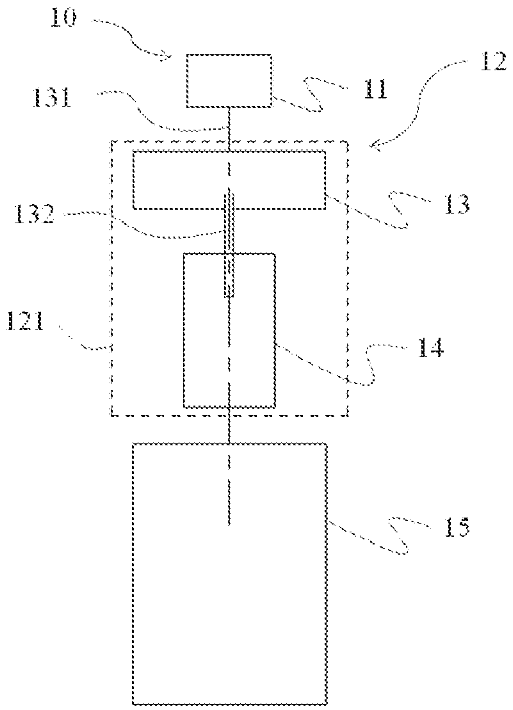
FIG. 11 is a schematic diagram of an on-load tap changer with an accumulator according to embodiments of the present disclosure.

FIG. 11 shows a schematic diagram of an on-load tap changer 10 according to an embodiment of the present disclosure. The on-load tap changer includes an electric mechanism 11, an accumulator 13, an on-load changeover switch 14 and an off-load tap selector 15. A drive shaft 131 of the accumulator is able to rotate in any direction under a drive of the electric mechanism 11. A driven shaft 132 of the accumulator is able to drive the on-load changeover switch 14 to rotate. Moreover, through an action of the accumulator 13, the driven shaft 132 of the accumulator is able to drive the on-load changeover switch 14 to rotate in a direction during a once switching of the on-load tap changer 10, and rotate in an opposite direction during a next switching of the on-load tap changer 10. The on-load changeover switch 14 and the off-load tap selector 15 are constructed using the related art and therefore are not shown in detail in the present disclosure. The off-load tap selector 15 is configured to preselect a winding tap (n, n+1) to be switched to without load, and the on-load changeover switch 14 is configured to switch from a current winding tap to a preselected new winding tap (n, n+1) with load. The accumulator 13 and the on-load changeover switch 14 are combined together to form a switching core 12 and are enclosed in a housing 121 of the switching core shell. During a working process of the on-load tap changer 10, the drive shaft 131 of the accumulator drives both the accumulator 13 and the off-load tap selector 15, and the accumulator 13, the on-load changeover switch 14 and the off-load tap selector 15 are connected in series, so that the switching core 12 and the off-load tap selector 15 are connected in series and distributed in an integrated manner.

Figure 12:
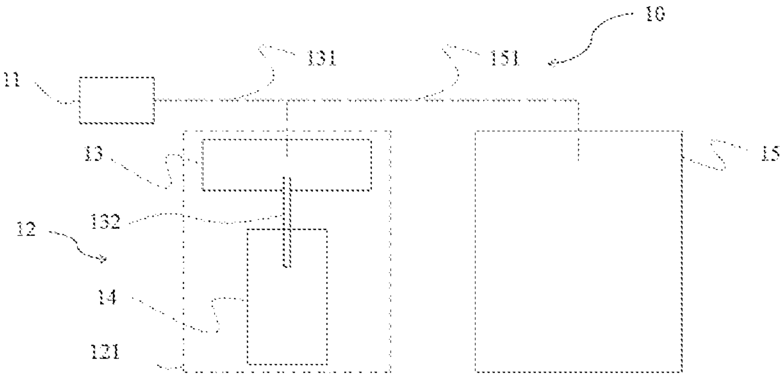
FIG. 12 is a schematic diagram of an on-load tap changer with an accumulator according to embodiments of the present disclosure.

FIG. 12 shows another schematic diagram of an on-load tap changer according to an embodiment of the present disclosure. The on-load tap changer includes an electric mechanism 11, an on-load changeover switch 14, an off-load tap selector 15, and an accumulator 13. The accumulator 13 and the on-load changeover switch 14 form a switching core 12 and are enclosed in a housing 121 of the switching core. The switching core 12 and the off-load tap selector 15 are connected in parallel and distributed in a split manner, and the off-load tap selector is disposed in a transformer, and the switching core is disposed outside the transformer. The electric mechanism 11 drives a drive shaft 151 of the selector, and the drive shaft 151 of the selector drives the off-load tap selector 15 to enable the off-load tap selector to preselect a winding tap to be switched to without load. The drive shaft 131 of the accumulator is driven by the electric mechanism to realize that the on-load changeover switch is switched from a current winding tap to a preselected new winding tap with load. A driven shaft 132 of the accumulator is able to drive the on-load changeover switch 14 to rotate. Moreover, through an action of the accumulator 13, the driven shaft 132 of the accumulator is able to drive the on-load changeover switch 14 to rotate in a direction during a once switching of the on-load tap changer 10, and rotate in an opposite direction during a next switching of the on-load tap changer 10. The on-load changeover switch 14 and the off-load tap selector 15 are constructed using the related art and therefore are not shown in detail in the present disclosure.

The above descriptions are only related to some embodiments of the present disclosure, but the protection scope of the present disclosure is not limited thereto. Any changes or replacements that can be readily thought of by those skilled in the art within the technical scope disclosed in the present disclosure shall be covered by the protection scope of the present disclosure.

The content that is not described in detail in the specification of the present disclosure belongs to the well-known technology to those skilled in the art.

What is claimed is:

1. A full range boosting device for an accumulator of an on-load tap changer, comprising a first sheave intermittent mechanism, a second sheave intermittent mechanism, and a central gear;

wherein the first sheave intermittent mechanism and the second sheave intermittent mechanism each comprise a dial gear, a driving dial, a dial round pin, a driven sheave and a boosting plate; the driving dial with the dial round pin and the dial gear are fixed coaxially with no contact in an axial direction, the boosting plate is fixedly connected to the driven sheave, and a radial slot is formed in the driven sheave;

wherein the first sheave intermittent mechanism and the second sheave intermittent mechanism are installed alternately in an up-down direction, and two dial gears are driven by the central gear; and a positional relationship of the first sheave intermittent mechanism and the second sheave intermittent mechanism satisfies following constraints:

in the first sheave intermittent mechanism, the driving dial rotates an angle of $\alpha 1$, the boosting plate on the driven sheave rotates an angle to be boosted by a cooperation of the dial round pin and the radial slot in the driven sheave; and when the driving dial of the second sheave intermittent mechanism rotates an angle of $(360°-\alpha 1)$, the dial round pin of the second sheave intermittent mechanism is exactly located at a notch of the radial slot.

2. The full range boosting device according to claim 1, wherein in an initial state, a component to be boosted on the accumulator of the on-load tap changer is disposed between two boosting plates.

3. The full range boosting device according to claim 1, wherein only one radial slot is formed in the driven sheave.

4. An accumulator for an on-load tap changer, comprising an epicyclic gear train, a mechanical energy storage device, the full range boosting device according to claim 1, a drive transmission mechanism with a variable instantaneous transmission ratio, a drive shaft, a driven shaft, a limiting device, and a flywheel; wherein the flywheel is connected to the driven shaft without relative rotation;

the drive transmission mechanism with the variable instantaneous transmission ratio is configured to convert a rotation of the drive shaft in any direction into a unidirectional rotational drive of the epicyclic gear train;

the limiting device is configured to limit the flywheel during an energy storage process of the mechanical energy storage device;

the mechanical energy storage device is configured to perform a mechanical energy storage during a rotation of the epicyclic gear train and a stationary process of a driven wheel, and supply power for the epicyclic gear train to continue to rotate after the mechanical energy storage is in place, the epicyclic gear train is configured to unlock the limiting device and drive the flywheel to rotate, and drive the driven shaft to rotate to a predetermined terminal angular position; and the full range boosting device provides an auxiliary thrust to ensure that the driven wheel rotates to the predetermined terminal angular position.

5. The accumulator according to claim 4, wherein the epicyclic gear train comprises a sun gear, at least one planetary gear, a ring gear, and a planet carrier device; the sun gear is fixedly connected with the central gear coaxially, the flywheel is fixedly connected to the ring gear through two starting plates, the at least one planetary gear is disposed between the ring gear and the sun gear through the planet carrier device, and meshes with the ring gear and the sun gear respectively; the planet carrier device is axially located between the ring gear and the flywheel and rotates coaxially with the ring gear and the flywheel, and one end of the mechanical energy storage device is rotatably connected to a central shaft of one of the at least one planetary gear, such that the mechanical energy storage device follows a rotation of the one of the at least one planetary gear to implement a state change of tension and relaxation.

6. The accumulator according to claim 5, wherein during a process of rotating the driving dial of the first sheave intermittent mechanism or the second sheave intermittent mechanism in the full range boosting device by the angle of (360°−α1), the ring gear remains stationary due to a limiting function of the limiting device, one of the at least one planetary gear is driven by the sun gear to run to a dead center position of the epicyclic gear train, at this time, the ring gear is unlocked, and the mechanical energy storage device gradually relaxes from a tensioned state.

7. The accumulator according to claim 5, wherein the planet carrier device comprises two trigger levers and a planet carrier;

wherein the planet carrier comprises a central rotating part and a protruding strut corresponding to a respective one of the at least one planetary gear, and the respective one of the at least one planetary gear is installed on an upper end surface of the corresponding protruding strut through the central shaft; and the two trigger levers are protruded from the central rotating part for unlocking the limiting device.

8. The accumulator according to claim 4, wherein the limiting device comprises two hook protrusions disposed on the flywheel, two hooks, two hook limiting stops and a limiting stop; wherein the hooks, the hook limiting stops and the limiting stop are all installed on a lower bracket; the limiting stop is configured to limit a rotation of the flywheel; the two hooks are configured to cooperate with the two hook protrusions respectively to implement a rotation restriction on the flywheel after the flywheel is in place during two switches; and each of the two hook limiting stops is configured to perform a limiting function in a state where a respective one of the two hook protrusions is not hooked by a respective one of the two hooks.

9. The accumulator according to claim 8, wherein for each of the two hooks, a main body of the hook is a member bar with a bend hook, and a collision bar and a limiting bar are disposed on two sides of the member bar respectively; a compression spring is installed between the respective hook limiting stop and the member bar with the bend hook, when the bend hook is hooked to the respective hook protrusion, the compression spring is in a compressed state, and the collision bar may be triggered by a trigger lever disposed on a planet carrier device to complete a disengagement of the bend hook from the respective hook protrusion; after the bend hook is disengaged from the respective hook protrusion, the compression spring provides a thrust to the member bar with the bend hook, a limiting function of the hook is implemented by a cooperation of the limiting bar and the respective hook limiting stop, and at this time, a position of the collision bar is ensured not to interfere with the trigger lever.

10. The accumulator according to claim 9, wherein a stress point existing in a contact surface between the bend hook and the respective hook protrusion and a rotation center of the hook are on a same circular arc surface, centered on a central shaft of the flywheel.

11. The accumulator according to claim 4, wherein the drive transmission mechanism with the variable instantaneous transmission ratio comprises a curved slotted plate, a drive fan gear, a roller, and a first central gear;

wherein the curved slotted plate is connected to the drive shaft without relative rotation, and a curved slot is formed in a lower end surface of the curved slotted plate; the drive fan gear is fixedly connected with the roller in a radial direction that can move in the curved slot, the roller can be driven by the curved slotted plate to drive the drive fan gear to rotate, the drive fan gear meshes with the first central gear, and the first central gear is coaxially fixed with the central gear in the full range boosting device; and the curved slot has two terminal angular positions on a same straight line as a center of the central shaft, such that the curved slotted plate is rotated 180° from any direction, and the roller can be rotated from one terminal angular position to another terminal angular position.

12. The accumulator according to claim 11, wherein a curve of the curved slot is bounded by the two terminal angular positions, an equation of the curve on a first side is $x'=R\cos(\omega+\beta)$, and $y'=R\sin(\omega+\beta)$; and an equation of the curve on a second side is $x''=R\cos(\omega-\beta)$, and $y''=R\sin(\omega-\beta)$; wherein taking a rotation center of the curved slotted plate as a coordinate origin, $x'$ and $x''$ are abscissas of various points on the curve, $y'$ and $y''$ are ordinates of various points on the curve; R is a radial length of the roller of the drive fan gear, $\omega$ is a radial inclination angle of the roller of the drive fan gear, and $\beta$ is a rotation angle of the curved slotted plate.

13. The accumulator according to claim 12, wherein $$R=\sqrt{x^2y^2}=\sqrt{(r\cos(\theta+\alpha)+L)^2+(r\sin(\theta+\alpha))^2},$$

where x is an abscissa of the roller of the drive fan gear, y is an ordinate of the roller of the drive fan gear, r is a distance between the roller of the drive fan gear and a rotation central axis of the drive fan gear, $\theta$ is an inclination angle of starting and ending positions of the drive fan gear, L is a distance between a rotation central axis of the curved slotted plate and the rotation central axis of the drive fan gear, and a is a rotation angle of the drive fan gear.

14. The accumulator according to claim 12, wherein the radial inclination angle of the roller of the drive fan gear is $$\omega=\sin^{-1}\left(\frac{r\sin(\pi-\theta-\alpha)}{R}\right),$$

where $\theta$ is an inclination angle of starting and ending positions of the drive fan gear, and $\alpha$ is a rotation angle of the drive fan gear.

15. The accumulator according to claim 4, wherein the mechanical energy storage device comprises an elastic energy storage sleeve and two elastic energy storage guide rods; and an elastic energy storage element is sleeved outside the two elastic energy storage guide rods, a first end of a small-diameter elastic energy storage guide rod is hinged on the planetary gear, a second end of the small-diameter elastic energy storage guide rod is inserted into an inner cavity of a large-diameter elastic energy storage guide rod, and the large-diameter elastic energy storage guide rod is inserted into the elastic energy storage sleeve, so that the elastic energy storage element is located in an inner cavity of the elastic storage energy sleeve, and the large-diameter elastic energy storage guide rod and the elastic energy storage sleeve are both hinged with a lower bracket.

16. The accumulator according to claim 4, wherein in an initial state, a component to be boosted on the accumulator of the on-load tap changer is disposed between two boosting plates.

17. The accumulator according to claim 4, wherein only one radial slot is formed in the driven sheave.

18. An on-load tap changer, comprising:

the accumulator according to claim 4;

an electric mechanism configured to provide a drive rotation power for the drive shaft of the accumulator;

an on-load changeover switch; and an off-load tap selector configured to preselect a winding tap to be switched to without load, wherein the on-load changeover switch is configured to switch from a current winding tap to a preselected new winding tap with load.

19. The on-load tap changer according to claim 18, wherein the accumulator, the on-load tap changer and the off-load tap selector are connected in series.

20. The on-load tap changer according to claim 18, wherein the accumulator is connected with the on-load changeover switch to form a switching core, the switching core and the off-load tap selector are connected in parallel and distributed in a split manner, the off-load tap selector is placed in a transformer, and the switching core is placed outside the transformer.

* * * * *